(12) United States Patent
Schramm et al.

(10) Patent No.: US 6,745,942 B1
(45) Date of Patent: Jun. 8, 2004

(54) MAGNETIC SYMBOLOGY READER

(75) Inventors: Harry F. Schramm, Winchestor, TN (US); William C. L. Shih, Palos Verdes Estates, CA (US); Gerald L. Fitzpatrick, Issaquah, WA (US); Craig Knisely, Seattle, WA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/214,482

(22) Filed: Aug. 5, 2002

(51) Int. Cl.[7] .................................................. G06K 7/08
(52) U.S. Cl. ....................... 235/449; 235/493; 359/280; 359/484
(58) Field of Search ............................... 235/449, 493; 359/280, 484, 324, 579

(56) References Cited

U.S. PATENT DOCUMENTS

| 4,574,312 | A |   | 3/1986  | Anderson             |         |
|-----------|---|---|---------|----------------------|---------|
| 4,625,167 | A |   | 11/1986 | Fitzpatrick          |         |
| 4,695,796 | A | * | 9/1987  | Omet et al. .......... | 324/226 |
| 4,947,107 | A | * | 8/1990  | Doerfler et al. ...... | 324/96  |
| 5,053,704 | A |   | 10/1991 | Fitzpatrick          |         |
| 5,281,912 | A | * | 1/1994  | Togawa ............... | 324/244.1 |
| 5,422,744 | A |   | 6/1995  | Katz et al.          |         |
| 5,446,378 | A |   | 8/1995  | Reich et al.         |         |
| 5,483,161 | A | * | 1/1996  | Deeter et al. ........ | 324/244.1 |
| 5,486,944 | A |   | 1/1996  | Bard et al.          |         |
| 5,638,207 | A | * | 6/1997  | Fukuzawa et al. ...... | 359/375 |
| 5,742,036 | A |   | 4/1998  | Schramm, Jr. et al.  |         |
| 5,773,973 | A |   | 6/1998  | Horn                 |         |
| 5,866,894 | A |   | 2/1999  | Bard et al.          |         |
| 6,111,416 | A |   | 8/2000  | Zhang et al.         |         |

OTHER PUBLICATIONS

Valeiko et al. "Magneto–optical Visualizer–Magnetometer of High Magnetic Fields", Nov. 1995, IEEE Transactions on magnetics, vol. 31, No. 6, pp. 4293–4296.*

* cited by examiner

Primary Examiner—Michael G. Lee
Assistant Examiner—Seung H Lee
(74) Attorney, Agent, or Firm—James J. McGroary; Stephen J. Stark

(57) ABSTRACT

A magnetic symbology reader has a housing containing a polarized light source which directs light through a magneto-optic sensor onto a reflector which reflects light back through the magneto-optic sensor and then through at least one analyzer and into at least one camera. A view finder allows the user to monitor the image on the magneto-optic sensor as seen by a viewfinder camera while a processor is coupled to possibly a second camera so that when an image is detected, the image from the camera may be processed by the processor to output information associated with the symbol to an external source. The analyzer and polarized light source provide contrast in the images detected by the sensor. A bias/erase coil located about the magneto-optic sensor can enhance or erase images on the sensor.

20 Claims, 1 Drawing Sheet

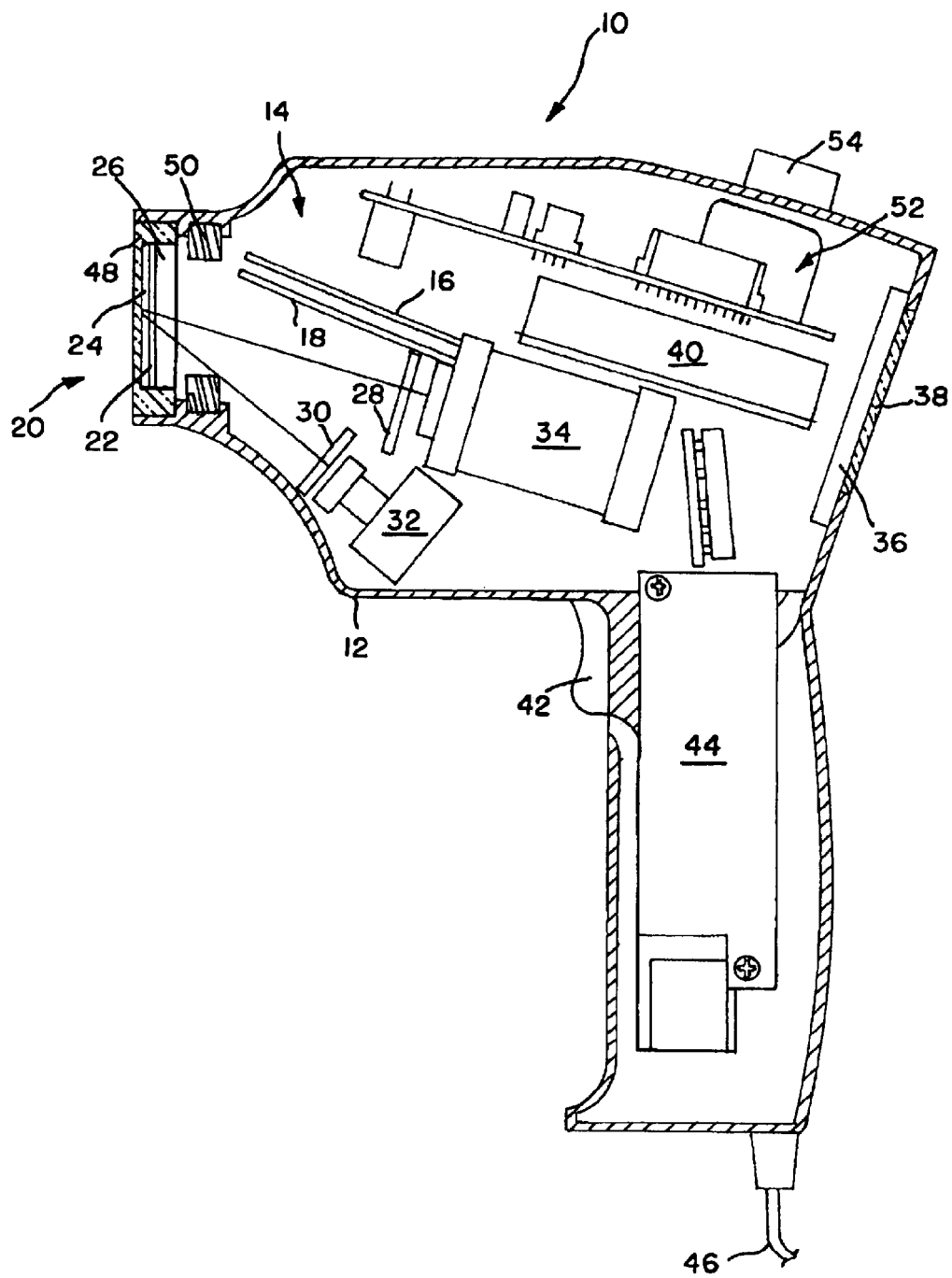

MAGNETIC SYMBOLOGY READER

STATEMENT OF GOVERNMENT INTEREST

The invention described herein was assigned to the United States Government and may be manufactured and used by or for the Government of the United States for governmental purposes without the payment of any royalties thereon or therefore.

BACKGROUND OF THE INVENTION

1. Field of the Invention

The present invention is directed to a magnetic symbology reader, and more particularly, to an improved method and device for utilizing magneto-optic imaging techniques.

2. Description of the Related Art

Automatic identification comes in many forms, the most familiar being bar coding because it is seen by the general population daily at retail outlets. Bar coding is generally applied on a product label or with a sticky label. Other types of automatic identification are used when the mark is desired on the surface of the product (direct part marking), thereby eliminating the label. Identification symbols marked on parts are visible and are read with CCD devices and decoded.

Direct part marking for automatic identification has evolved to the point that optically visible marks are no longer the only option. The use of special substances in additive marks (those that are applied to the substrate that combine metallurgically and rest on or above the substrate) is a new field of use for 2-dimensional identification symbols. In this case marking material is combined with magnetic substances that are detectable using magneto-optic sensors. These sensors are integrated with the decoding device to form a magnetic symbology reader. These magnetic marks are detectable and decodable through paint and other coatings.

U.S. Pat. No. 5,742,036, incorporated by reference, shows a method of marking, capturing and decoding machine readable matrix symbols utilizing magneto-optic imaging techniques. The magneto-optic imaging apparatus disclosed in that reference has omissions which renders the magneto-optic portion of the apparatus inoperable. Accordingly the present invention rectifies these limitations. This is a necessary modification of the referenced patent for this device to be commercially viable.

SUMMARY OF THE INVENTION

An object of the present invention is to correct certain limiting aspects of U.S. Pat. No. 5,742,036 so as to provide an improved method and apparatus for reading and decoding machine-readable, but hidden, matrix symbol markings as well as other 2-dimensional identification symbols on substrate materials.

Another object of the present invention is to provide a method and apparatus for reading/decoding machine-readable-matrix symbols covered or obscured by, for example, paint. These obscured symbols contain magnetic material so as to render them visible to the magneto-optic sensor.

Another object of the present invention is to provide magnetic symbology reader which utilizes polarized light in conjunction with a magneto-optic sensor.

Accordingly, a magnetic symbology reader of the preferred embodiment utilizes a magneto-optic sensor in conjunction with a number of other elements which are necessary for the successful operation of the reader. Specifically, the reader has a source of polarized light contained therein which is directed through the magneto-optic sensor onto a reflector. The reflector reflects the polarized light back through the sensor to the symbol reader camera, and preferably to a view finder camera as well. Note that in principle a single camera with proper interfacing to the decoder circuitry and a Liquid Crystal Display (LCD) is possible. This would eliminate the need for a second viewfinder camera as in the preferred embodiment. The camera or cameras in all embodiments of the invention are equipped with polarizing analyzers so as to form magneto-optic images, and maximize dark-light contrast of magneto-optic images of magnetic symbology. In the event that magnetic fields associated with a magnetic symbol are not detected by the magneto-optic sensor, it is desirable for the light to pass through the sensor and analyzer substantially unimpeded. The analyzer is adjusted accordingly. Additionally, a bias/erase coil is provided proximate to the magneto-optic sensor to provide a way to adjust the effective sensitivity of the sensor.

The magneto-optic sensor produces an image thereon in the presence of a magnetic field which is perpendicular to the magneto-optic sensor so as to provide a visual representation of a magnetic field encountered by the sensor. The cameras visually record that image and while the view finder camera directs the image to a viewfinder, the symbol reader camera provides the visual image data to a symbol processor which decodes the magnetic symbology.

BRIEF DESCRIPTION OF THE DRAWINGS

The particular features and advantages of the invention as well as other objects will become apparent from the following description taken in connection with the accompanying drawings in which:

The FIGURE shows a cross sectional schematic view of a magnetic symbology reader of the preferred embodiment.

DETAILED DESCRIPTION OF THE DRAWINGS

Accordingly, the FIGURE shows a cross sectional schematic representation of the internal components of a magnetic symbology reader 10 having a housing 12 that contains a number of components. Specifically, within the housing 12 is located a polarized light source 14 which is preferably, but not exclusively, comprised of an Electro-Luminescent (EL) panel 16 and a polarizer 18 which serves to act as a filter to direct polarized light toward the base 20 of the reader 10. As the light within the housing 12 travels toward the base 20, it passes through magneto-optic sensor 22 and encounters a reflective surface illustrated as a reflector 24 which prevents light from passing through the base 20 external to the housing 12. Virtually, if not all, the light incident on the reflector 24 is reflected back into the housing 12. The reflector 24 may be constructed of an aluminized MYLAR (J) sheet or other appropriate material. In order to protect the reflector 24 and sensor 22, a fiberglass panel 48 is preferably located at the base 20 of the reader 10.

The magneto-optic sensor 22 has been constructed of a 0.020 substrate and a film grown in a melt to produce an active sensor. The substrate is glued onto a PYREX (J) backing or other appropriate material. The illustrated backing 26 is approximately ⅛" thick.

As the polarized light source 14 directs light through the sensor 22 it contacts the reflector 24 and is directed back through the sensor 22. The light then continues on through one or more analyzers 28,30 and into cameras 32,34, respectively as will be explained in further detail below. The analyzers 28,30 are polarization filters which are adjusted at an angle with respect to the polarization of the polarized light source 14. Light from the source 14 reflects off the reflector 24 and preferably passes through the analyzers 28,30 when the sensor 22 is not in the presence of a magnetic field such as would be caused by magnetic symbology.

The polarized light source 14 in conjunction with the analyzer(s) 28,30, magneto-optic sensor, and reflector 24 provide twice the dark-light contrast. As those skilled in the art are aware, polarized light is affected by magneto-optic materials. The presence of a magnetic disturbance shifts the angle of polarization of light passing through magneto-optic materials. Accordingly, when the magnetic sensor 22 is magnetized in some direction normal to its surface, the angle of polarization of the light from the polarized light source 14 incident upon the sensor 22 as it passes through and is reflected back through the sensor 22 will be changed at locations on the sensor detecting a magnetic source. Accordingly, the analyzers 28,30 are capable of filtering out the shifted light and the cameras 32,34 see dark areas where the magnetic fields are indicated by the sensor 22. The combination of the polarized light source 14 with the analyzers 28,30, the sensor 22, and the reflector 24, has been instrumental in providing contrast and increasing the capability of the reader 10 over the designs disclosed in the prior art.

The first camera 32 is a view finder camera. The output of this camera is directed to a monitor 36 such as a liquid crystal display (LCD) screen, which can be viewed through an optional window 38 in the housing 12. When an LCD screen is utilized as a viewer 36, an LCID driver 40 as illustrated is necessary. The view finder camera 32 provides a way for the reader 10 to scan over material to allow an operator using the reader 10 to locate magnetic symbology obscured by paint or otherwise. The reader 10 may then be utilized to interpret the information contained within the magnetic symbology.

Once a symbol has been located, trigger 42 may be depressed to activate camera 34 to provide an image to processor 44. The combination of camera 34 and processor 44 shown in this illustration can be obtained from Robotic Vision Systems, Inc., which is normally utilized as an optical two-dimensional symbology reader under the Part Number HE30. The device is often utilized as a bar code reader or other symbology reader. The processor 44 is equipped with the capability of analyzing the visual image on the magneto-optic sensor, as recorded by the camera 34, and subsequently decoding the digitized image. The processor 44 outputs the corresponding information from the image which has been captured by the camera 34.

While the optical reader (Part Number HE 30) is used for visually reading symbols, it has not heretofore been utilized in combination with a magnetic optic sensor to provide the capability of reading magnetic symbology. Other optical readers available from other commercial sources similar in form, fit and function to the HE 30 may be used in the present invention.

Data may be output from the processor 44 such as through output cord 46 to a computer such as in the ASCII code or other format so that various functions such as inventory control, quality assurance, or other function may be performed. The cord 46 may also house a power cord for supplying power to the reader 10.

While the reader 10 described above has performed satisfactorily to read magnetic symbology through 0.024 inches of paint, an enhancer coil 50 in the form of a bias/erase coil has been placed proximate to and about the sensor 22. The bias/erase coil is controlled by circuitry 52 which can be operated by a control knob 54 or otherwise. When activated, electricity is run through the coil which creates a magnetic field, which is more or less perpendicular to the sensor 22. By applying a magnetic field to the sensor 22, using the enhancer coil 50, it may be possible to enhance the visual image indicated on the sensor 22 when the base 20 is located proximate to an appropriate symbol. Alternatively, by reversing the magnetic field through the coil or otherwise increasing or decreasing its strength with circuitry 52 and control 54, the otherwise persistent images may be erased. Accordingly, the coil may be controlled to detect weaker fields or tone down very strong fields such that the image displayed on the sensor 22 is within the tolerances of the image to be captured by the cameras 32,34 for proper operation of the reader 10.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A magnetic symbol reader comprising:
   a housing;
   a polarized light source located within the housing transmitting polarized light;
   a reflector receiving the polarized light from the polarized light source;
   a magneto-optic sensor intermediate the reflector and the polarized light source, wherein the polarized light passes through the magneto-optic sensor as the polarized light travels to and from the reflector;
   a first camera directed at the magneto-optic sensor configured to receive an image;
   a fist analyzer intermediate the first camera and the magneto-optic sensor; and
   a processor in communication with the first camera wherein the image is provided from the first camera to the processor wherein the processor evaluates the image relative to data previously associated with at least one stored image at the processor, said data further comprising at least one representation of a number and a letter.

2. The magnetic symbol reader of claim 1 wherein the polarized light source is comprised of an electroluminescent panel and a polarizing filter.

3. The magnetic symbol reader of claim 1 further comprising a protective panel, and wherein the reflector is proximate to the magneto-optic sensor and located within the housing, said reflector located intermediate the protective panel and the first analyzer.

4. The magnetic symbol reader of claim 1 further comprising a selectively operable enhancer connected to the housing and located proximate to the magneto-optic sensor, wherein operation of the enhancer affects the image displayed on the magneto-optic sensor.

5. The magnetic symbol reader of claim 4 wherein the enhancer further comprises a coil disposed about a perimeter of the magneto-optic sensor, said coil in communication with circuitry which provides an electric signal to the coil.

6. The magnetic symbol reader of claim 5 wherein the coil provides a magnetic field perpendicular to the magneto-optic sensor.

7. The magnetic symbol reader of claim 5 further comprising a controller coupled to the coil, said controller capable of at least one of enhancing and erasing detections on the magneto-optic sensor.

8. The magnetic symbol reader of claim 1 further comprising a second camera and a second analyzer intermediate the second camera and the magneto-optic sensor, said second camera outputting an image to a display on a reader connected to the housing.

9. The magnetic symbol reader of claim 8 wherein the display is visible through a window through the housing.

10. The magnetic symbol reader of claim 1 wherein the first camera and processor are part of a visual symbol reader.

11. The magnetic symbol reader of claim 1 wherein the first camera is a charged coupled device camera.

12. The magnetic symbol reader of claim 1 wherein the data output from the processor is sent external to the housing.

13. The magnetic symbol reader of claim 1 wherein the first camera is located within the housing.

14. A magnetic symbol reader comprising:
a housing;
a camera directed at a magneto optic sensor within the housing; and
a selectively controllable enhancer located within the housing and proximate to the magneto-optic sensor, said enhancer in communication with circuitry capable of imposing a magnetic field on the sensor to affect the clarity of magnetic readings on the sensor.

15. The magnetic symbol reader of claim 14 wherein the enhancer is a coil disposed about the magneto-optic sensor.

16. The magnetic symbol reader of claim 15 further comprising a polarized light source directing light through the magneto-optic sensor.

17. The magnetic symbol reader of claim 16 further comprising a reflector located opposite the magneto-optic sensor from the polarized light source reflecting light back through the magneto-optic sensor.

18. The magnetic symbol reader of claim 17 further comprising an analyzer located intermediate the camera and the magneto-optic sensor.

19. The magnetic symbol reader of claim 16 wherein the polarized light source is located within the housing.

20. The magnetic symbology reader of claim 14 further comprising a processor in communication with the camera, said processor receiving an input from the camera and evaluating the input relative to data associated with images, and upon locating a match, outputting said data.

* * * * *